March 23, 1948. H. G. WATKIN 2,438,262
ELECTRIC WELDING MACHINE
Filed Feb. 21, 1945 4 Sheets-Sheet 1

Inventor
Harold G. Watkin
By [signature]
Atty.

March 23, 1948.   H. G. WATKIN   2,438,262
ELECTRIC WELDING MACHINE
Filed Feb. 21, 1945   4 Sheets-Sheet 2
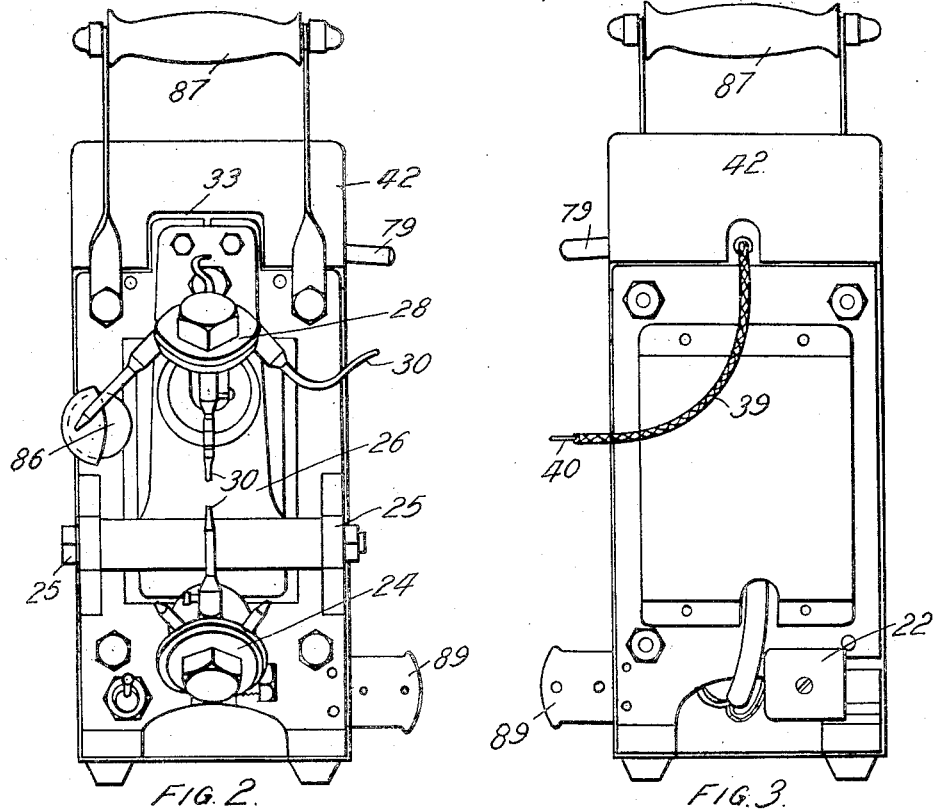
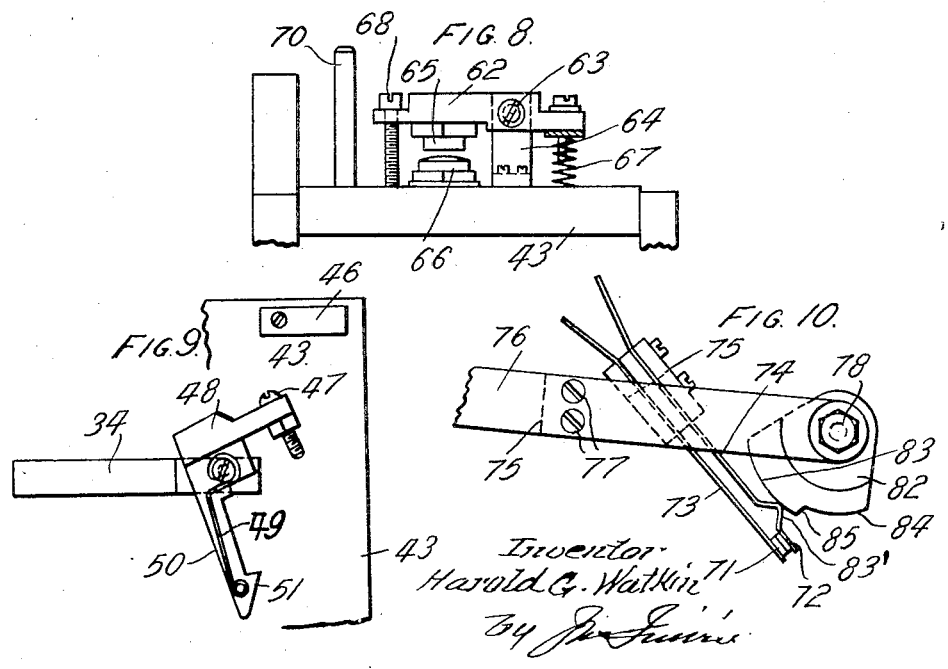
Inventor
Harold G. Watkin

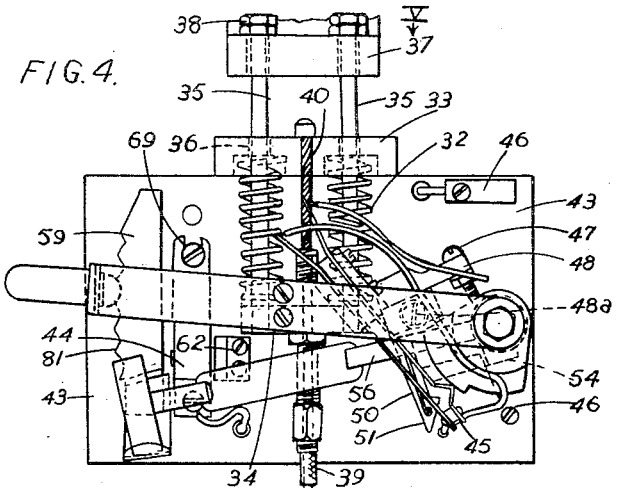
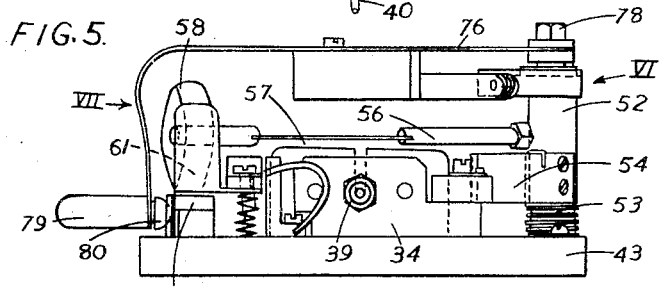
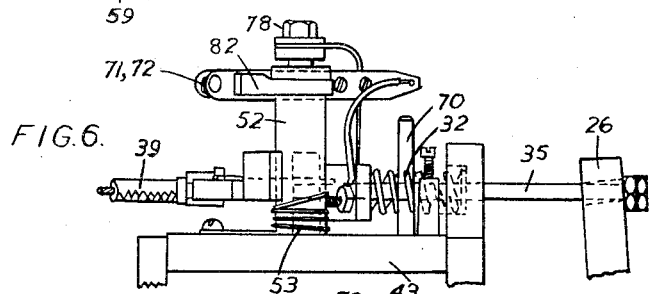
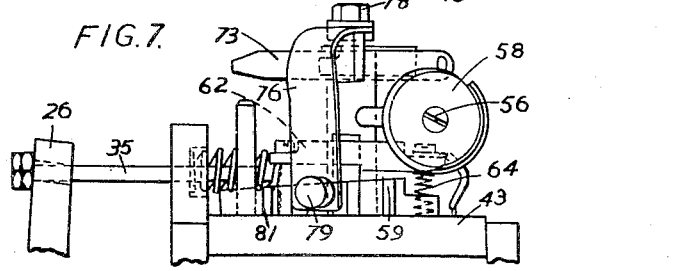

March 23, 1948.  H. G. WATKIN  2,438,262
ELECTRIC WELDING MACHINE
Filed Feb. 21, 1945  4 Sheets-Sheet 4
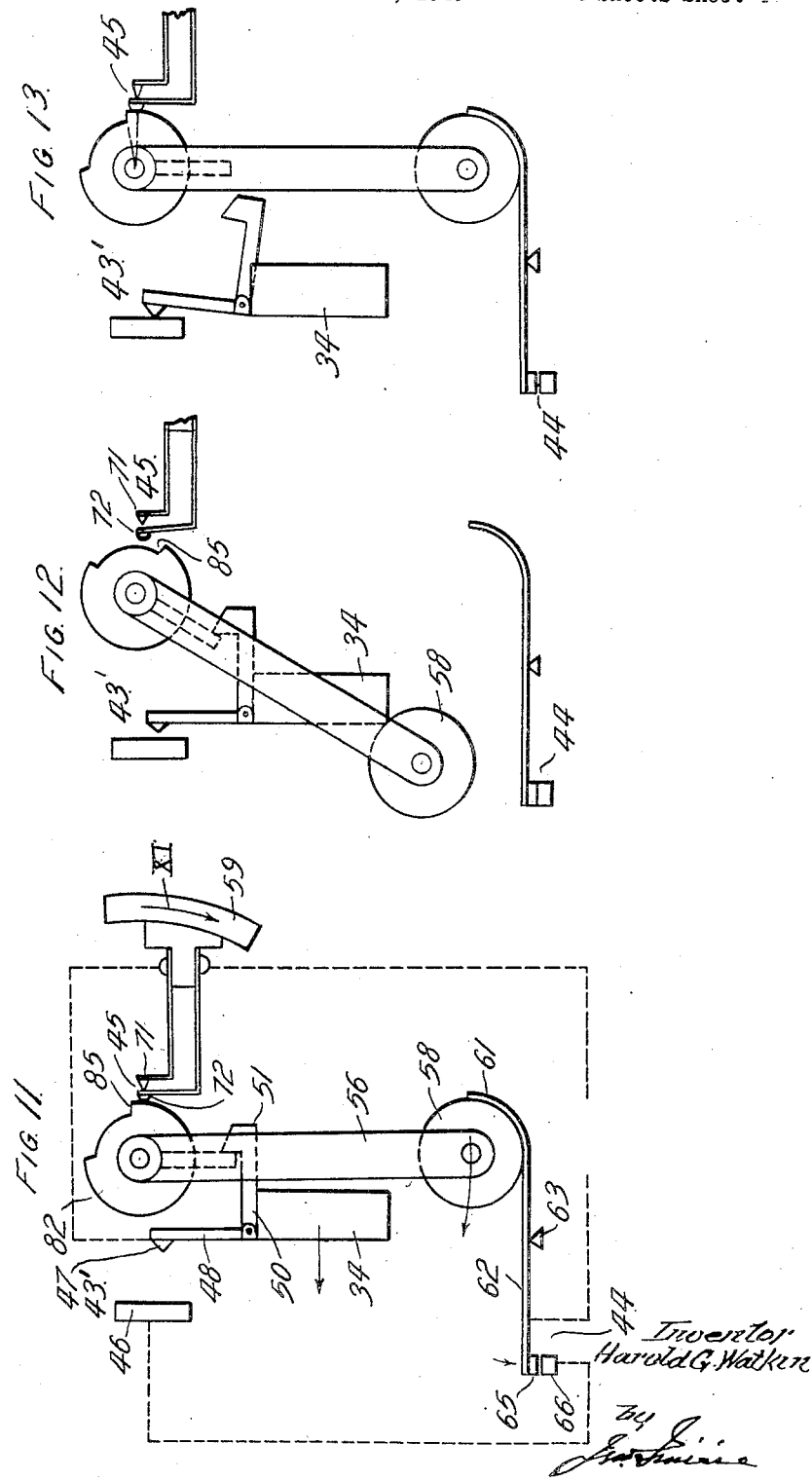

Patented Mar. 23, 1948

2,438,262

UNITED STATES PATENT OFFICE 2,438,262

ELECTRIC WELDING MACHINE

Harold Gladstone Watkin, Liverpool, England

Application February 21, 1945, Serial No. 579,081
In Great Britain February 16, 1944

3 Claims. (Cl. 219—4)

This invention is for improvements in or relating to electric welding machines and particularly welding machines of the kind comprising at least two electrodes, operating means for bringing said electrodes towards one another and onto the work pieces to be welded, and a switch mechanism controlling the flow of welding current and operated by said operating member in synchronism with the movement of the electrodes.

The improvements, according to the present invention, are particularly applicable to the welding machine forming the subject-matter of my Patent No. 2,130,657.

It is most important in a welding machine designed to carry out delicate welding operations that the current should only flow for a very short period of time and the length of such period must be under accurate control. If the current flow is maintained for more than the maximum permissible time, then the work being welded will be burnt to a damaging extent. At the same time it is desirable that the operator of the machine should be able accurately and easily to adjust the time of current flow so as to suit the particular job in hand.

An object of the present invention is to provide an improved time switch mechanism for welding machines of the character above set forth, by which the time of flow of current can be accurately predetermined and accurately and easily adjusted when required.

According to the present invention there is provided an electric welding machine of the kind specified, wherein the switch mechanism comprises a timing switch for controlling the duration of time of flow of the welding current, timing switch closing means having a path of engagement with said timing switch for the closing thereof, means operatively connecting the switch mechanism to the machine operating member so as to cause relative movement between the timing switch and its closing means over the path of engagement thereof each time said member is operated, and means for effecting relative adjustment between the timing switch and its closing member so as to vary the length of said path of engagement and thereby the duration of time of flow of the welding current.

According to a further feature of the present invention there is provided a welding machine of the kind specified, wherein the switch mechanism comprises a timing switch for controlling the duration of time of flow of the welding current, a cam for closing said timing switch, means operatively connecting said cam to the machine operating member to effect movement thereof each time said member is operated, and means for adjusting the effective switch closing movement of the cam relatively to the timing switch to vary the length of time said switch is closed by the cam.

According to a still further feature of the present invention there is provided a welding machine of the kind specified and having a timing switch for the welding current comprising a spring-controlled cam shaft, an arm on said cam shaft, a pawl on a part of the machine-operating member adapted to move forward with said part when the machine is operated and to engage said arm and carry it and the cam shaft with it against the control spring thereof and subsequently release said arm and permit return movement of the cam shaft under the action of its spring, a cam on said cam shaft, resilient contact means adapted to be closed by the cam on return movement of the cam shaft and means for adjusting the point of engagement of said resilient contact means with the cam so as to vary the length of time the cam closes said contact means.

According to a still further feature of the present invention there is provided a welding machine of the kind specified and having a switch mechanism comprising in series a cam-operated timing switch, a primary switch and a cut-off switch and means for adjusting the effective stroke of the cam operating the timing switch so as to vary the length of time the welding current flows, the said cam being spring-operated and the machine-operating member stressing said spring and then releasing the cam for an operating stroke under the action of its spring, wherein the cam moves simultaneously, during stressing of said spring, with means which close the cut-off switch, then open the timing switch and finally close the primary switch.

Preferably the cut-off switch is made to have a very limited space "break" because it is found that with alternating current a small "break" eliminates or reduces any tendency for an arc to form between the contacts and maintain the current flow beyond the desired period. Means are provided for adjusting the "break" of the cut-off switch to compensate for wear.

The invention will be further described, with reference to the accompanying drawings, as applied to a portable welding machine particularly suitable for carrying out delicate welding operations such as are met with in dental work. On the drawings—

Figure 2 is a front elevation,

Figure 3 is a rear elevation,

Figure 1:
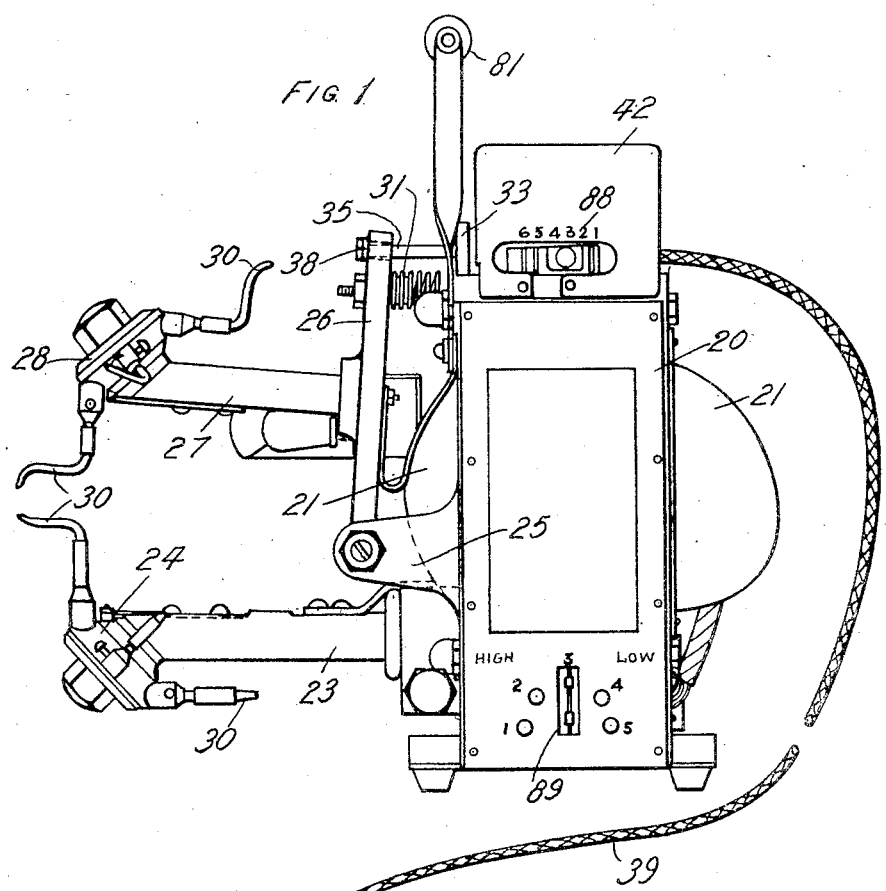
Figure 1 is a side elevation of the machine.
Figure 1A:
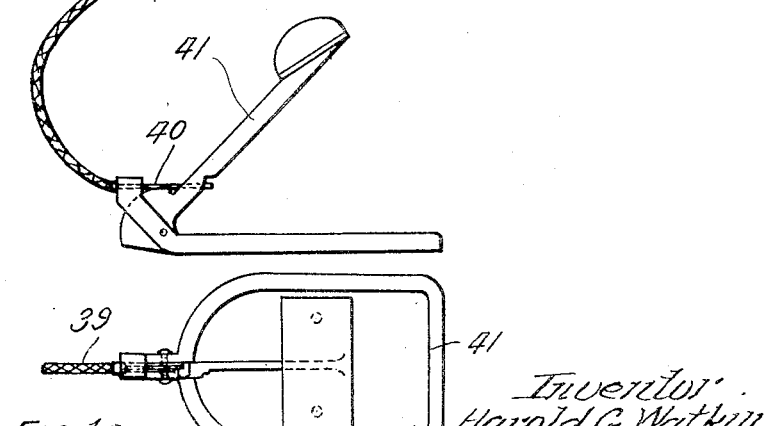
Figure 1a is a view of the foot pedal operator.

Figure 4 is a fragmentary plan view of the switch mechanism of the machine, with the switch cover removed, Figure 5 is a rear elevation of the switch mechanism viewed in the direction of the arrow V of Figure 4, Figure 6 is a side elevation of the switch mechanism viewed in the direction of the arrow VI of Figure 5, Figure 7 is a side elevation of the switch mechanism viewed in the direction of the arrow VII of Figure 5, Figure 8 is a detail elevation of a cut-off switch forming part of the switch mechanism, Figure 9 is a detail plan view of a primary switch forming part of the switch mechanism, Figure 10 is a detail plan view of a timing switch forming part of the switch mechanism, and Figures 11, 12 and 13 are diagrams of the switch mechanism showing the sequence of movements which take place in carrying out a welding operation.

The general design of the machine is similar to that of the machine described in the specification of my Patent No. 2,130,657. The machine comprises a casing or frame 20 which houses an electrical transformer 21 for stepping-up the voltage of the electricity, supplied via the plug connector 22, to that required for carrying out a welding operation. The frame carries a lower arm 23, the extremity of which supports a turret-like electrode holder 24. The frame also has lugs 25 which support between them a rocking member 26 having an arm 27 which also supports a turret-like electrode holder 28. The electrode holders 24 and 28 each carry four electrodes 30 and by adjusting the holder angularly different electrodes can be brought opposite to one another and into a position for carrying out a welding operation. A spring 31 acts on the arm 26 to urge it into a position so as to bring the electrodes together and this movement is resisted by springs 32 located between a lug 33 on the frame 20 and a switch-operating block 34 (see Figure 4). The switch-operating block is secured to guide rods 35 which have a sliding fit in holes 36 in the lug 33 and pass freely through the holes 37 in the member 26. The forward ends of the guide rods have nuts 38 threaded on them which form abutments for limiting forward movement of the rocking member 26. The sheath 39 of a Bowden wire is anchored to the switch-operating block 34 whilst the wire 40 proper thereof is anchored to the lug 33. The Bowden wire is operatively connected to a foot pedal 41 and the arrangement is such that when the pedal is depressed the switch-operating block 34 is caused to move forwardly, compressing the springs 32 and permitting the spring 31 to move the member 26 and bring the electrodes towards one another.

The switch mechanism of the machine is housed in a casing 42 mounted on the upper part of the machine. This switch mechanism comprises a base plate 43 of insulating material on which is mounted a primary switch 43', a cut-off switch 44 and a timing switch 45. The primary switch comprises a fixed contact in the form of a block 46 and a moving contact stud 47 attached to an insulated arm 48 of a bellcrank lever pivoted to the switch-operating block 34 at 48a under the control of a spring 49. The other arm 50 of the bellcrank lever has a hooked end 51 for a purpose to be hereinafter explained.

The cut-off switch comprises a pillar 78 secured in the base plate 43 and carrying an angularly movable sleeve 52 having a control spring 53. An insulated arm 54 is attached to the sleeve 52 and is adapted to be engaged by the hooked end 51 of the bellcrank lever 48, 50. The sleeve 52 also has a radial arm 56 having a resilient section 57 and provided at its end with a freely rotatable roller 58. The roller 58 is adapted to run on an inclined track or block 59 having a step 60 at one end but normally the roller lies on a rest 61 attached to one end of a cut-off switch lever 62 pivoted at 63 to a bracket 64 secured to the base plate 43. The lever 62 carries a platinum contact 65 adapted to engage a fixed platinum contact 66 secured to the base plate 43. A spring 67 acts on the lever 62 so as to bring the contacts 65, 66 into engagement with one another but when the roller 58 is on its rest 61 it biases the lever against the spring 67 and maintains the contacts 65, 66 out of engagement with one another although the clearance between them is very small. A screw 68 threaded into the base plate 43 has its head engaging a forked end 69 of the lever 62 to provide for adjustment of the clearance between the contacts 65, 66. A stop 70 is provided for the arm 56.

The timing switch comprises a pair of contacts 71, 72 mounted on spring arms 73, 74 which tend to spring apart so as to open the switch. The arms 73, 74 are insulated from one another and are secured to an adjustable timing arm 76 by screws 77. The timing arm 76 is pivoted to the upper part of the pillar 78 for angular adjustment thereon independently of the sleeve 52. At its outer end the timing arm is provided with a finger-and-thumb grip 79 and a projection 80 adapted, due to the resiliency of the arm, to snap into any one of a series of vertical recesses or notches 81 in the track 59 so as to hold and locate the arm 76 in any one of its several positions of adjustment. A cam 82 is secured to the sleeve 52 for movement therewith and has a part 83 of its periphery adapted to engage the contact arm 74, at 83', so as to close the timing switch contacts 71, 72, and a cut-away part 84 which, when it is opposite the projection 83' of the contact arm 74, permits the timing switch contacts 71, 72 to open. By adjusting the timing arm 76 the projection 83' is moved nearer to or further from the edge 85 of the cut-away part 84 of the cam 82 so as to vary the time of flow of the welding current.

The electrical connections of the machine and of the various switches above described will be clearly understood from Figure 11 of the drawings.

A lamp 86 is provided on the machine and it also has a handle 87 to facilitate its transport from place to place.

The manner of operation of the machine will now be described in detail with particular reference to Figures 11, 12 and 13.

Prior to carrying out a welding operation the parts of the machine are in the positions shown in Figures 1 to 11 inclusive. To carry out a welding operation the parts to be welded together are inserted between the electrodes 30 and the pedal 41 is depressed. This brings the electrodes onto the work piece and causes the switch-operating block 34 to move forward taking with it the bellcrank lever 49, 50, the hooked end 51 of which engages the arm 54 and causes angular movement of the sleeve 52. This in turn results first in the closing of the cut-off switch 44, due to the movement of the roller 58, and second in the opening of the timing switch 45, due to the rotation of the cam 82. Further movement of the block 34 closes the primary switch 43 and then the hooked end 51 of the bellcrank lever 49, 50 snaps over the end of the arm 54 and releases is so that the sleeve 52 flies back to its initial position, as shown in Figure 13 under the action of its spring 53. During this return movement of the sleeve, the velocity of which depends on the spring 53, current will flow in the welding circuit. The welding circuit is opened by the cut-off switch 44. It will be noted that on its return movement the roller 58 is steadied by the fact that it has to run up the inclined surface of the track 59 and at the end of the stroke the wheel slips over the step 60 of said track which gives a dead-beat operation of the cut-off switch. The period of time of flow of current depends on the length of time the welding circuit is closed by the timing switch before it is opened by the cut-off switch. In the particular case shown in Figures 11, 12 and 13 the welding circuit will be closed for a period equal to the length of time taken by the periphery 83 of the cam 82 to move through the angle A (see Figure 13) under the action of the spring 53. This angle can, of course, be varied to give different periods of current flow by angular adjustment of the timing switch contacts about the periphery of the cam 82 by means of the timing arm 76 as above described. The further the contacts are moved in the direction of the arrow XI (Figure 11) the longer will be the period of flow of current.

An index 88 is provided on the casing of the switch mechanism to facilitate the selection of a particular setting of the timing arm. A plug 89 is provided for the selection of alternative transformer tappings.

I claim:

1. Switching mechanism of the type employed in connection with a welding machine of the kind specified and having a timing switch for the welding current comprising a spring-controlled cam shaft, an arm on said cam shaft, a pawl on a part of the machine-operating member which pawl moves forward with said part when the machine is operated and engages said arm and carries it and the cam shaft with it against the control spring thereof and subsequently releases said arm and permits return movement of the cam shaft under the action of its spring, a cam on said cam shaft, resilient contact means adapted to be closed by the cam on return movement of the cam shaft and means for adjusting the point of engagement of said resilient contact means with the cam so as to vary the length of time the cam closes said contact means.

2. Switching mechanism of the type employed in connection with a welding machine of the kind specified and having a switch mechanism comprising in series a cam-operated timing switch, a primary switch and a cut-off switch wherein the cut-off switch has a very limited space "break" and means for adjusting the effective stroke of the cam operating the timing switch so as to vary the length of time the welding current flows, the said cam having spring-operating means and the machine-operating member stressing said spring means and then releasing the cam for an operating stroke under the action of its spring, and means moving simultaneously with the cam during stressing of said spring, which means close the cut-off switch, then open the timing switch and finally close the primary switch.

3. An electric welding machine of the kind comprising a welding circuit including electrodes or terminals for connecting a work piece in the welding circuit, switch means controlling the flow of welding current and means for closing said switch means to effect a welding operation, wherein said switch means comprises a timing switch, a cam device, a trip catch having an operative connection to the switch closing means and adapted to engage said cam device and pre-set it relatively to the timing switch against the action of a reaction means and subsequently to release the said cam device, so that on the return movement thereof under the action of the reaction means the cam will close the timing switch and thereby the welding circuit for a predetermined time.

HAROLD GLADSTONE WATKIN.

REFERENCES CITED

The following references are of record in the file of this patent:

UNITED STATES PATENTS

| Number | Name | Date |
| --- | --- | --- |
| 1,955,438 | Ragsdale | Apr. 17, 1934 |
| 2,130,657 | Watkin | Sept. 20, 1938 |
| 2,141,561 | Ryder | Dec. 27, 1938 |